June 18, 1963 A. J. RYAN ETAL 3,094,002
MAGNETIC LINKING MECHANISM FOR MEASURING INSTRUMENTS
Filed June 29, 1959 3 Sheets-Sheet 1

INVENTORS
ALFRED J. RYAN
FREDERICK J. RINK
BY
ATTORNEYS

June 18, 1963
A. J. RYAN ETAL
3,094,002
MAGNETIC LINKING MECHANISM FOR MEASURING INSTRUMENTS
Filed June 29, 1959
3 Sheets-Sheet 3
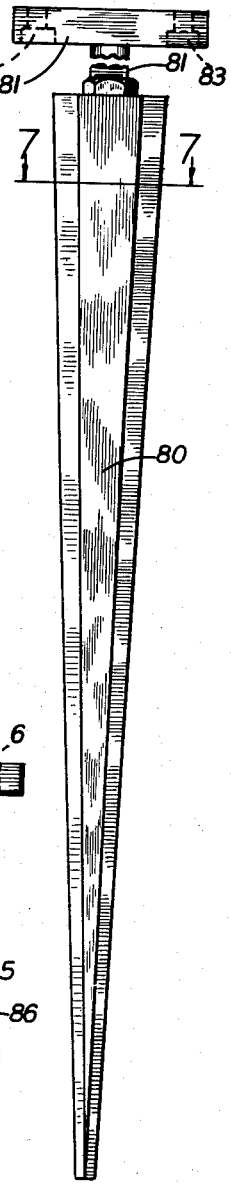
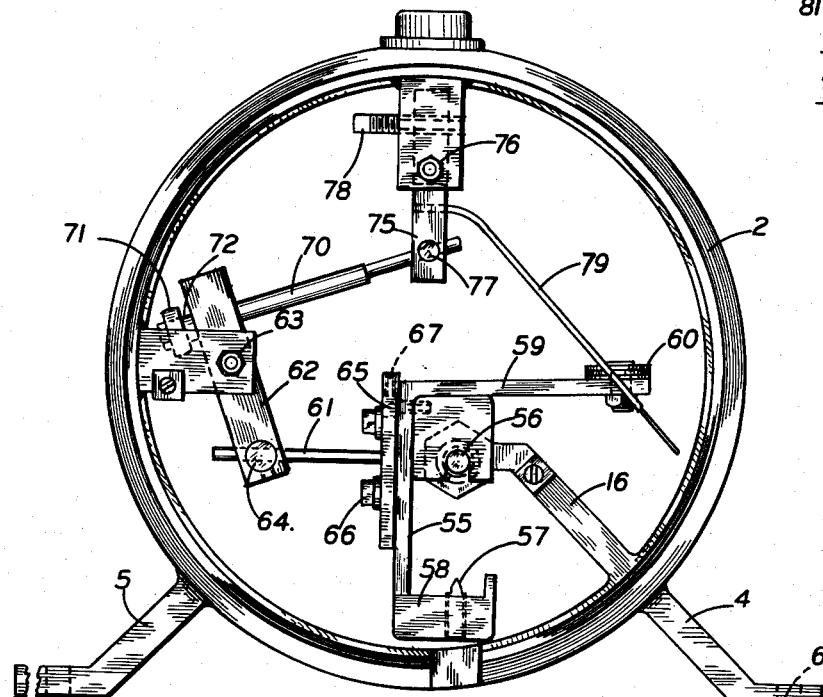
FIG.5.
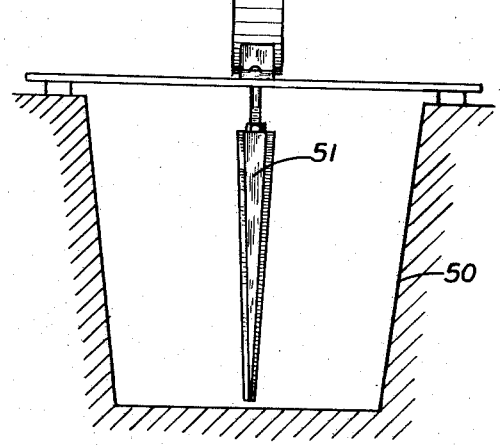
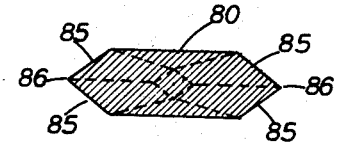
FIG.7.
FIG.6.
FIG.8.
INVENTORS
ALFRED J. RYAN
FREDERICK J. RINK
BY
*McGrew and Edwards*
ATTORNEYS

United States Patent Office 3,094,002
Patented June 18, 1963

3,094,002
MAGNETIC LINKING MECHANISM FOR
MEASURING INSTRUMENTS
Alfred J. Ryan and Frederick J. Rink, Denver, Colo.;
said Rink assignor to said Ryan
Filed June 29, 1959, Ser. No. 823,665
9 Claims. (Cl. 73—432)

This invention relates to improvements in measuring instruments, and more particularly to magnetic linkage mechanisms for transmitting and generally multiplying motions of a detector of such variables as pressure, temperature, liquid flow, and the like to an indicator which may be a pointer on a scale, pen of a recording instrument, etc.

In many commonly used measuring instruments, the movement of a detector is transmitted to some sort of an indicating means for measuring certain forces. For practicability, such instruments are made to cover a substantial range of the forces. Normally, this range covers relatively low forces as well as relative high forces. In the instruments, the linkage mechanism in the low force ranges has only slight movement since the force being measured is small, and this generally causes a substantial error in the low ranges. This error is generally due to the inertia of the parts, and the friction of the contacting parts of the mechanism. There is normally a relatively narrow portion near the middle of the instrument range which is fairly accurate, while in the upper ranges the accuracy is decreased. Also, in such devices the mechanical linkage always includes some sort of a backlash or play which, also, decreases accuracy.

According to the present invention, we provide a magnetic linkage for measuring instruments in which there is a minimum contact surface, and the only contacting members are rotary. There is provided a positive magnetic interconnection between the moving parts of the measuring instrument which provides a positive and relatively friction free movement of the parts through the range of the instrument. There is, also, provided a highly accurate fluid flow meter which has an essentially straight line calibration graph over its range.

Included among the objects and advantages of the present invention is a simplified linking mechanism for a measuring instrument utilizing a minimum of contacting moving parts, and providing maximum positive interlinkage of the parts of the linkage. The device provides a rugged and highly accurate linkage mechanism for measuring instruments which substantially reduces the maintenance of such devices. The linkage mechanism of the invention provides a positive movement of its elements throughout the entire range of the detecting device with an insignificant reduction of accuracy due to inertia and friction of parts, and providing accuracy throughout the entire range of the instrument without play and backlash of the parts of the linkage mechanism. An accurate flow meter is provided which is not subject to minor variations of surges, vane buoyancy, and the like and which has an essentially straight line calibration curve.

These and other objects and advantages of the invention may be readily ascertained by referring to the following description and appended illustrations in which:

FIG. 5 is a side elevational view of a slightly modified form of a measuring instrument;

FIG. 6 is a side elevational view of a pendant vane detector for measuring fluid flow in an open channel and which may be attached to the measuring instrument of FIG. 5 for actuating the mechanism;

FIG. 7 is an enlarged cross section of the vane of FIG. 6 taken along section line 7—7; and FIG. 8 is a perspective view of a flow meter illustrating a mounting of a detector vane in an open channel and secured to a measuring instrument.

For purposes of illustrating the invention the linking mechanism is illustrated in a gauge for measuring flow of liquid in an open conduit, shown in FIG. 8, where a pendent vane 51 is suspended from and moves a suspension mechanism in the instrument when subjected to flowing water in a channel 50. The movement of the suspension mechanism is indicated by a pointer attached to the instrument and as the movement is a function of the volume of the flow, it may be calibrated in terms of flow. It is to be understood, however, that various types of detecting mechanisms which move may be used to move the linkage of the instrument.

Figures 1, 2, 3:
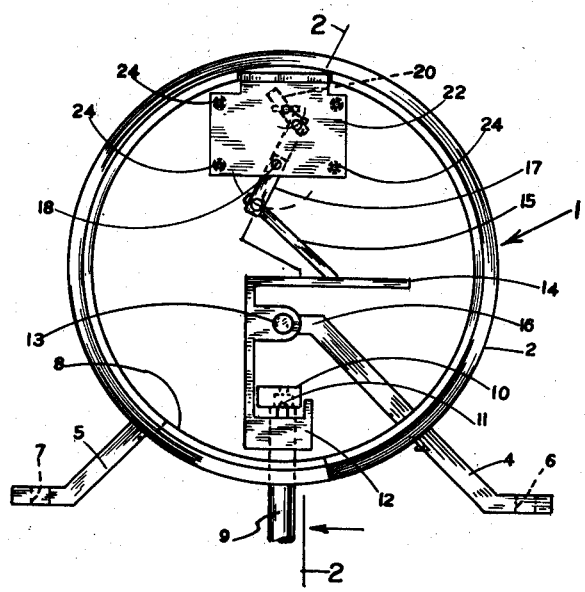
FIG. 1 is a side elevational view of one form of a measuring instrument utilizing the linkage according to the invention.
FIG. 2 is a sectional view through the instrument illustrated in FIG. 1 taken along section line 2—2.
FIG. 3 illustrates one form of an indicating mechanism for interconnection with a linkage mechanism according to the invention.

In the device illustrated in FIGS. 1-4, a meter or gauge 1 includes a cylindrical frame 2 which may have a solid back and a dial front 3, illustrated in FIG. 3, for enclosing the mechanism. Also, such an instrument may have a dial face on both sides for taking readings from either side. The circular frame 2 is supported on feet 4 and 5, having bolt holes 6 and 7, respectively, therein for securing the meter on a base. The frame 2 is of a width sufficient to accommodate the linkage mechanism, and a disc-shape cover is secured to and encloses both sides of the frame. Where the disc-shape cover is over a scale, it is transparent or partly transparent, one such cover 3 is illustrated. In a lower portion of the frame 2, a slot 8 is provided to accommodate a suspended member 9 to which is attached a pendent vane 51. The slot 8 permits swinging movement of the member 9 in the direction of the flow. The suspension rod 9 is secured on a T head 10 balanced on spaced points 11 which are mounted on a pivot member 12. The pivot member is mounted for swinging on pivot 13. A laterally directed arm or platform 14 has a ferromagnetic rod 15 substantially rigidly mounted thereon and extending generally upwardly. The distance which the rod 15 is offset from the axis of rotation provides one portion of the multiplication of the linkage mechanism. An H-magnet 17, the details of which are described below, is mounted on a pivot 18 so that one end of the H straddles the rod 15 so that it is in the magnetic fields of the magnet. The rod is dimensioned so as to maintain an air gap on both sides. A secondary or dial linkage bar 20 is rotatably mounted on a pivot 21 for swinging movements, and it is mounted with one end in position to be straddled by the opposite end of the H magnet 17, and mounted so as to maintain an air gap on each side of the bar 20.

In one form, the leg or support 4 extends through the frame or case 2 of the instrument and provides at its upper end 16 a support for the pivot pin 13. An internal frame in the upper portion of the frame 2 includes front plate 22 and rear plate 23 interconnected by bolts 24 at each corner, which provides a mounting for the pivot pins 18 and 21.

The H-shaped magnet, illustrated in FIG. 2, includes an upper section 30 which is a horseshoe magnet 30 integrally interconnected with a diamagnetic U-shaped member 31. The H member is mounted on a pivot 18. On opposed legs of the diamagnetic U-shaped member 31 is mounted small disc magnets 32 and 33. These disc magnets, not directly connected together, are oriented so as to form a north and south pole for the lower part of the H magnet. The secondary linkage includes a diamagnetic bar 20 (for example aluminum) pivoted on the pin 21. Embedded in the lower end of the diamagnetic bar 20 is a small sphere 35 of a paramagnetic material, which is arranged to be mounted in between the poles or the legs of the horseshoe magnet 30 with an air gap on each side of it and each pole of the magnet. A pointer or indicating mechanism 37 is secured to the extension of the shaft 21 which is arranged with its pointing head 39 juxtaposed above a calibrated scale 40, mounted on disc 3. When two faces or scales are used, the shaft is extended in both directions and a pointer mounted on each end.

While there is considerable latitude in the dimensions of the various parts along radial lines extending from each of the shafts, all of the parts should be made to be relatively rigid to lateral movement so as to maintain the air gaps at end of the H magnet. The air gap between the paramagnetic materials and the magnets prevent touching of the parts of the suspension members. Thus the parts should be mounted with substantially no wobble or sideplay. By providing relatively wide sleeve or other pivot bearing, the parts may be mounted on the pivots with substantially no lateral wobble but they are freely rotatable thereon.

Figure 4:
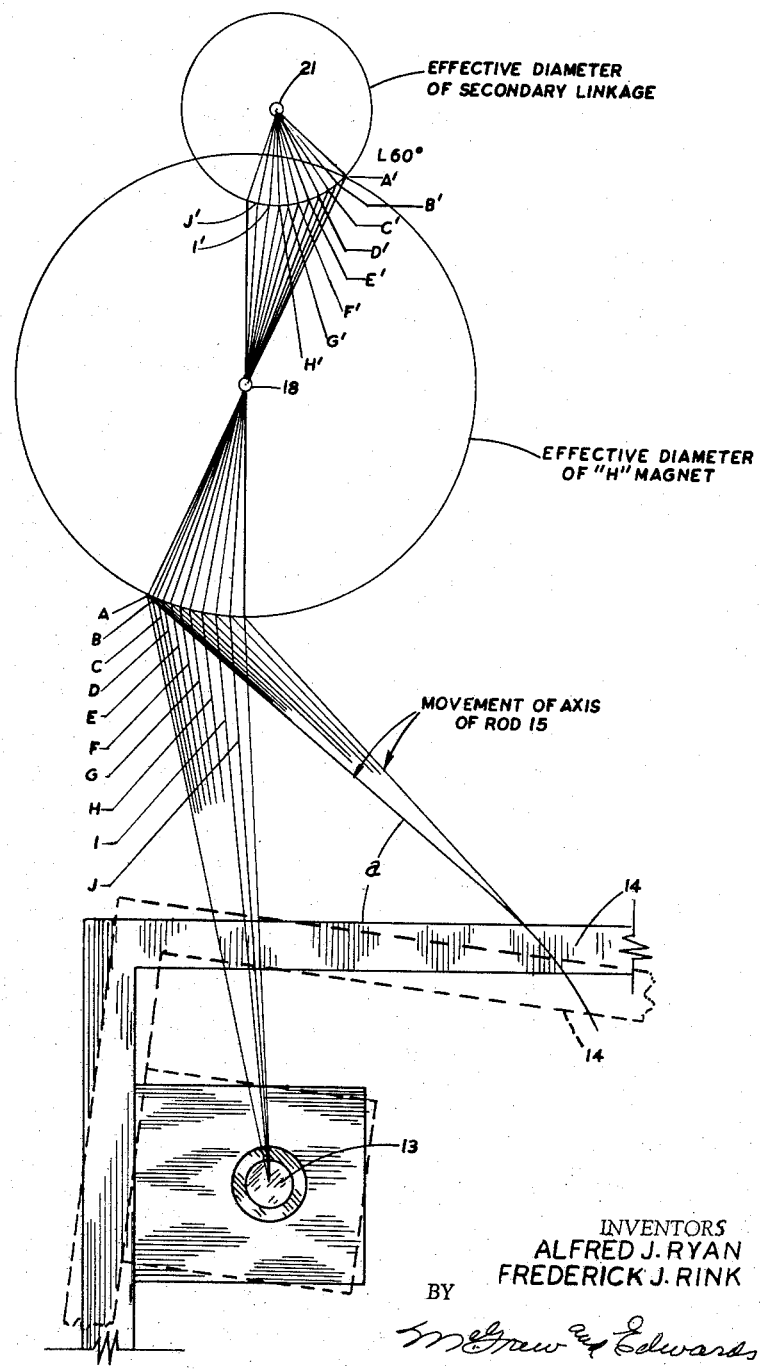
FIG. 4 is a schematic view illustrating the ratio of movement of the various components of the device in relation to other components, showing the multiplication feature of the linkage mechanism.

The movement and multiplication of the mechanism is illustrated for one form of the invention in FIG. 4, more or less schematically with reference to the arcs of rotation of the parts. The platform 14 has a rod 15 mounted thereon at about a 50° angle to the vertical. The H magnet has an effective diameter of 2.375 inches and a secondary linkage having an effective diameter of 1 inch. Swinging the suspension mechanism through very small arcs provides a substantial multiplication of the movement of the secondary linkage indicator. For the dimensions given, the following table illustrates movement and multiplication of the movement through the instrument.

*Linkage Movement*

| Position | Angle of Movement of Rod | Angular Movement of Secondary Linkage, degrees |
| --- | --- | --- |
| A | 0° | 0 |
| B | 0°18′ | 7 |
| C | 0°34′ | 14 |
| D | 1°00′ | 20 |
| E | 1°35′ | 26 |
| F | 2°20′ | 33 |
| G | 3°15′ | 40 |
| H | 4°22′ | 47 |
| I | 5°35′ | 53 |
| J | 6°50′ | 60 |

From the table it is apparent that very small movements of the suspension member are multiplied to large angular movements of the secondary linkage mechanism so that a large scale indicator may be utilized. The multiplication of the linkage is very easily changed by changing the distance of the rod 15 from the center of rotation of the axis 13. The multiplication ratio may, also, be changed by changing the angle A of the rod to the vertical so that angular movement of the second or H member is changed from a lower position of the theoretic arc of rotation, as illustrated, to one side or the other. In the lowermost position, maximum deflection occurs and as the position of connection moves away from the lower part of the arc of rotation to an upper part, the multiplication decreases. The same is true of the secondary linkage, so that if the major movement is along the bottom of the arc or circle, the deflection of the mechanism will be greatest. Thus it is apparent that substantially any desired multiplication may be obtained for the linkage mechanism, and since there are only three contact points for movement and no contact between the various members, the friction is maintained at a minimum.

The instrument illustrated in FIG. 5 utilizes a slightly different linkage arrangement which gives a greater multiplication. The frame 2 is provided with supporting feet 4 and 5 in the manner of the device of FIG. 1. A support 16 provides a pivotal mounting for a pivot member 55 pivotally supported on pivot pin 56. Pointed pins 57 on arm 58 provide support for a pendent vane. A counterbalance arm 59 is provided with weights 60 providing means for balancing the instrument. A paramagnetic rod 61 is secured rigidly to member 55 extending outwardly therefrom. A bar 62 is pivotally mounted on pivot pin 63 with a suitable bearing, for example a jeweled bearing. The lower end of bar 62 is bifurcated and a pair of magnets 64 are mounted thereon so as to straddle the rod 61 leaving an air gap on each side. The rod 61 is preferably mounted for adjustment as to position, and for this purpose it is mounted in plate 65 which is held by cap screws 66. An adjusting screw 67 provides for vertical adjustment.

A paramagnetic rod 70 is rigidly mounted in bar 62 and extends generally upwardly. A counterbalancing nut 71 is adjustably provided on an extension 72 opposite rod 70. The rod 70 is straddled by the bifurcated end of a bar 75 pivotally mounted on pin 76, having suitable bearings. A pair of magnets 77 are mounted in the ends of bar 75 so as to be positioned on each side of rod 70 with an air gap therebetween. The bar 75 has a counterbalance 78 in the form of a bolt for providing proper balance. A pointer 79 is mounted on bar 75 and extends down to be in position on a calibrated scale (not shown).

A pendent vane 80 made of brass or other suitable heavy metal, has a bolt 81 mounted in the head thereof. A T head 82 is secured to the bolt, and hardened seats 83 mounted in the head are arranged to contact pins 57 and provide fulcrum points for supporting the vane. The vane includes chamfered sides 85 extending the length thereof leaving sharp edges 86. The vane thus is free to swing on the pins. Surges, floating objects, etc. contacting the vane cause it to swing with very little movement of the mount 55, while the pressure of the water in the channel moves the vane and the mount causing the pointer to move along the scale. Thus the scale may be calibrated to indicate flow, and due to the free swing of the vane and the magnetic linkage, the pointer is very steady.

The vane provides a very accurate detector for a rectangular or trapezoidal cross-section channel. For a two feet deep canal, having a horizontal bottom at the vane position, a vane two feet long has been found highly satisfactory. The vane of brass has a 2½ inch top tapered down to ⅜ inch, ⅝ inch thick, and weighs about 3½ pounds. The edges are chamfered to about 35°, which provides a fluid flow around the vane reducing planing, effects of buoyancy, and providing a straight line calibration curve.

The operation of the device of FIG. 5 is similar to the operation of the device of FIG. 1. In the case of the device of FIG. 5, movement of a vane suspended from arm 58 moves rod 61. The magnets 64 follow the rod causing movement of bar 62 and rod 70. Magnets 77 follow the rod causing bar 75 to move and the pointer 79 along with it.

While the invention has been illustrated by reference to a specific embodiment, there is no intent to limit the spirit and scope of the invention to the precise details so set forth, except insofar as defined in the appended claims.

We claim:

1. In a measuring instrument or the like having indicating means thereon for measuring a movement of a detector member, the improvement which comprises a paramagnetic arm mounted on the detector member in position to swing through an arc in response to movement of the detector member, a linking member pivotally mounted with one end swingable through an arc in proximity to said paramagnetic arm and the other end concurrently swingable through an arc, each of said ends of said linking member being bifurcated and magnetizable thereby forming an effective horseshoe magnet at each end, the end of said linking member in proximity to said paramagnetic arm straddling said paramagnetic arm and spaced therefrom whereby movement of said arm causes movement of said linking member, a diamagnetic indicating support pivotally mounted adjacent to and straddled by the other bifurcated end of said linking member and maintained in spaced relation, and a small paramagnetic body mounted in said diamagnetic support in position to complete a magnetic linkage between the two members whereby movement of said linking member moves said indicating support.

2. In a measuring instrument or the like having indicating means thereon for measuring a movement of a detector member, the improvement which comprises a paramagnetic arm mounted on the detector member in position to move along a predetermined course in response to movement of the detector member, a linking member mounted in proximity to said paramagnetic arm, both ends of said linking member being bifurcated and magnetizable thereby forming an effective horseshoe magnet at each end, one end of said linking member being juxtaposed with and spaced from said paramagnetic arm whereby movement of said arm causes movement of said linking member, a diamagnetic pointer support mounted adjacent to and juxtaposed between the other bifurcated end of said linking member, and a small paramagnetic body mounted in said diamagnetic support in position to complete a magnetic linkage between the two members and with air gap therebetween whereby movement of said linking member moves said pointer support.

3. In a measuring instrument or the like having a dial and a cooperative juxtaposed indicating pointer swingable through an arc thereon for measuring a movement of a pivoted detector member, the improvement which comprises a paramagnetic arm mounted on the detector member in position to swing through an arc in response to movement of the detector member, a linking member pivotally mounted in proximity to said paramagnetic arm, both ends of said linking member being bifurcated and magnetizable thereby forming an effective horseshoe magnet at each end, one end of said linking member being juxtaposed with and spaced with an air gap from said paramagnetic arm whereby movement of said arm causes movement of said linking member, a diamagnetic pointer support pivotally mounted adjacent to and juxtaposed between the other bifurcated end of said linking member, and a small paramagnetic body mounted in said diamagnetic support in position to complete a magnetic linkage between the two members and with an air gap therebetween whereby movement of said linking member moves said pointer support.

4. In a measuring instrument or the like having a dial and a cooperative juxtaposed indicating pointer swingable through an arc thereon for measuring a movement of a pivoted detector member, the improvement which comprises a paramagnetic arm mounted in position to swing through an arc in response to movement of the detector member, a linking member pivotally mounted above and in proximity to said paramagnetic arm, both ends of said linking member being bifurcated and magnetizable thereby forming an effective horseshoe magnet, one end of said linking member being juxtaposed at its lowermost point of swing with and spaced by an air gap from said paramagnetic arm whereby movement of said arm causes swinging movement of said linking member, a diamagnetic pointer support pivotally mounted adjacent to and juxtaposed between the other bifurcated end of said linking member, and a small paramagnetic body mounted in said diamagnetic support in position to complete a magnetic linkage between the two members whereby movement of said linking member moves said pointer support.

5. A measuring instrument according to claim 4 in which the small paramagnetic body mounted in the diamagnetic support is a sphere.

6. In a measuring instrument or the like having a dial and a cooperative juxtaposed indicating pointer swingable through an arc for measuring movement of a detector member, the improvement which comprises, a paramagnetic arm eccentrically mounted on said detector member in a position to swing through an arc in response to movement of the detector member, a linking member pivotally mounted in proximity to said paramagnetic arm, both ends of said linking member being bifurcated and magnetizable thereby forming an effective horseshoe magnet, one end of said linking member being juxtaposed with said arm and spaced by an air gap therefrom forming a magnetic link whereby movement of said arm causes movement of said linking member, a diamagnetic pointer support pivotally mounted adjacent to and juxtaposed between the other bifurcated end of said linking member and separated therefrom by an air gap, said pointer support being eccentrically mounted from said arm and said linking member, and a small paramagnetic body mounted in said diamagnetic support in position to maintain an air gap and to complete the magnetic linkage between said linking arm and said pointer support whereby movement of the linking member causes movement of said pointer support.

7. In a measuring instrument or the like having a dial and a cooperative juxtaposed indicating pointer swingable through an arc for measuring movement of a pivotal detector member, the improvement which comprises, a paramagnetic arm eccentrically mounted on said detector member and at an angle to the vertical in a position to swing through an arc in response to movement of the detector member, a linking member pivotally mounted in proximity to said paramagnetic arm, both ends of said linking member being bifurcated and magnetizable thereby forming an effective horseshoe magnet, one end of said linking member being juxtaposed with said arm and spaced by an air gap therefrom forming a magnetic link whereby movement of said arm causes movement of said linking member, a diamagnetic pointer support pivotally mounted adjacent to and juxtaposed between the other bifurcated end of said linking member and separated therefrom by an air gap, said pointer support being eccentrically mounted from said arm and said linking member, and a small paramagnetic body mounted in said diamagnetic support in position to maintain an air gap and to complete the magnetic linkage between said linking arm and said pointer support whereby movement of the linking member causes movement of said pointer support.

8. In a measuring instrument or the like having a dial and a cooperative juxtaposed indicating pointer swingable through an arc for measuring movement of a pivotal detector member, the improvement which comprises, a cylindrical paramagnetic arm eccentrically mounted on said detector member and at an angle to the vertical in a position to swing through an arc in response to movement of the detector member, a linking member pivotally mounted above and in proximity to said paramagnetic arm, both ends of said linking member being bifurcated and magnetizable thereby forming an effective horseshoe magnet, one end of said linking member being juxtaposed generally vertically above said arm and spaced by an air gap therefrom forming a magnetic link whereby movement of said arm causes movement of said linking member, a diamagnetic pointer support pivotally mounted adjacent to and juxtaposed above the other bifurcated end of said linking member, support being mounted to extend between the opposite ends of said linking member, and a small paramagnetic body mounted in said diamagnetic support in position to maintain an air gap and to complete the magnetic linkage between said linking arm and said pointer support whereby movement of the linking member causes movement of said pointer support.

9. In a measuring instrument or the like having at least one dial and a cooperative juxtaposed indicating pointer swingable through an arc for measuring movement of a pivotal detector member, the improvement which comprises a first paramagnetic arm interconnected with and movable by said pivotal detector, a linking member having a bifurcated end pivotally mounted in position to permit the bifurcated end to straddle said first paramagnetic arm, a pair of opposed magnets mounted in said bifurcated end straddling said first arm and maintaining an air gap therebetween, a second paramagnetic arm mounted on said linking member and extending therefrom, a pointer mount pivotally mounted adjacent the end of said second paramagnetic arm, there being a bifurcated end on said pointer mount straddling said second arm, a pair of opposed magnets mounted in said bifurcated end of said pointer mount maintaining an air gap therebetween, and an indicating pointer mounted on said pointer mount and extending to said dial.

References Cited in the file of this patent
UNITED STATES PATENTS

| | | |
|---|---|---|
| 1,228,325 | Joachim | May 29, 1917 |
| 1,786,058 | Fisher | Dec. 23, 1930 |
| 2,201,836 | McCune | May 21, 1940 |
| 2,371,511 | Faus | Mar. 13, 1945 |
| 2,632,421 | Perkins | Mar. 24, 1953 |
| 2,765,656 | Parshall | Oct. 9, 1956 |
| 2,857,762 | Parshall et al. | Oct. 28, 1958 |
| 2,880,411 | Van de Ven | Mar. 31, 1959 |
| 2,896,453 | Ryan | July 28, 1959 |

FOREIGN PATENTS

| | | |
|---|---|---|
| 277,327 | Germany | Aug. 10, 1914 |